Oct. 21, 1947.  E. DAVIS  2,429,345

CLAMPING AND STARTING TOOL FOR SCREWS OR THE LIKE

Filed March 13, 1944

ELIZABETH DAVIS
INVENTOR.

BY E. G. Charles
atty.

UNITED STATES PATENT OFFICE 2,429,345

CLAMPING AND STARTING TOOL FOR SCREWS OR THE LIKE

Elizabeth Davis, Wichita, Kans.

Application March 13, 1944, Serial No. 526,223

1 Claim. (Cl. 81—55)

This invention relates to a clamping and starting tool for screws or the like, and has for one of its objects, means for clamping parts together preparatory to securing said parts by bolts, screws, or the like.

Another object of this invention is to provide an adjustable guide for centering screws with threaded apertures at the time of clamping companion parts together.

A still further object of this invention is to provide in the tool an equalizing spring to compensate for threads of a screw, bolt, or the like varying in relation from threads on the turning shaft of the tool.

A still further object is to construct the tool in such a way that varying sizes of nut sockets and screw drivers are interchangeable and removably secured to the threaded shaft by spring tensioned ball and socket engagement.

These and other objects will hereinafter be more fully explained, reference being had to the accompanying drawings forming a part of this specification, and wherein like characters will apply to like parts in the different views.

Referring to the drawings.

Figure 1:
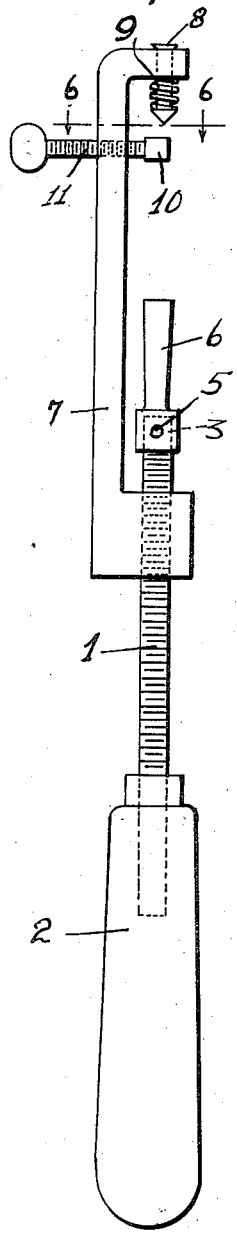
Fig. 1 is a side view of the tool.

As a more concise description of the invention it will be seen that the tool consists of a threaded shaft 1 having a turning handle 2 secured to one end thereof while the other end has a connecting square portion 3, said portion having a spring tensioned ball 4 secured therein adapted to engage in a socket 5, provided in the socketed shank 6 of driving elements later described.

An arm 7 is provided with transversely extending end portions, there being aligned bores in the end portions parallel with the arm. One bore is threaded to receive the threaded shaft 1 while the other bore is smooth to slidably receive a headed pin 8 projecting toward the driving element carried by said shank. A spring 9 is interposed between the head of the pin and its supporting end portion of arm 7 to yieldingly urge the pin towards the driving element.

Figures 2, 3:
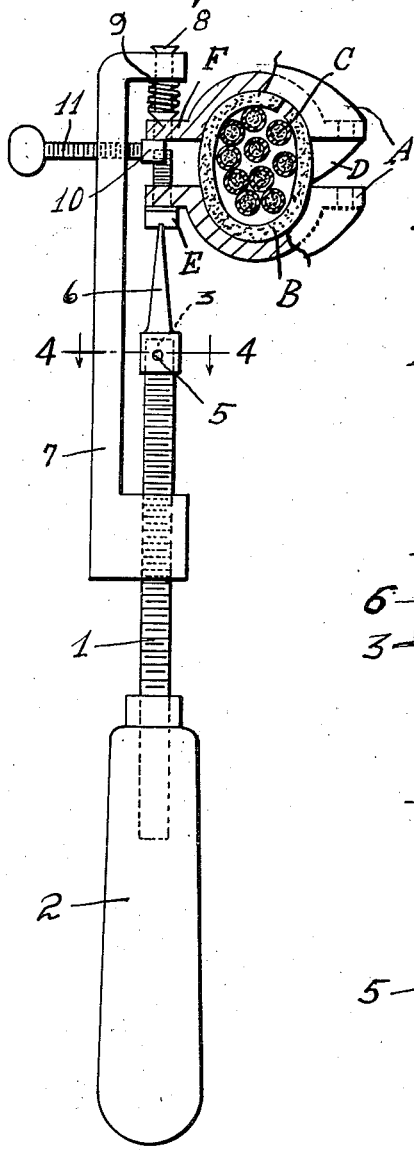
Fig. 2 is a similar view to that of Fig. 1 and illustrating the application of the tool.
Fig. 3 is an elevation of the plug and clamping means for electric wires, which are not part of the invention but merely shown to clarify the use of the tool.
Figure 4:
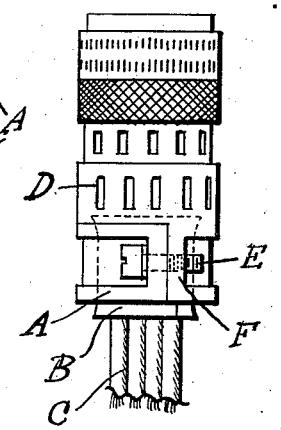
Fig. 4 is an enlarged sectional view taken on line 4—4 in Fig. 1.
Figure 5:
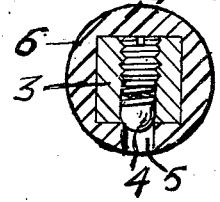
Fig. 5 is an enlarged side view of a socket for nuts or bolts which is adaptable to the tool.
Figure 6:
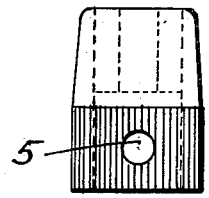
Fig. 6 is an enlarged sectional view taken on line 6—6 in Fig. 1.

To axially align the threaded shaft of a screw with the threaded bore of the upper ear F shown in Fig. 2, there is provided a saddle 10 swiveled on the inner end of a pin 11, threadedly engaging through the arm and adapted to seat on the screw adjacent said ear; said saddle being so positioned will permit the screw to enter the threaded bore prior to being clamped by the said ears, at which instant the starting tool is removed as said ears are connected sufficiently to remain intact for the application of a conventional screw driver to firmly bind the collars of the clamp together, and likewise the ears of the other side of said clamp members. In this instance, the said screw driver is alternately applied from side to side for uniformity of engagement with said felt packing, which in turn is firmly secured to the electric cable.

Fig. 2 illustrates the application of the tool to the collars A of a clamp, said collars having companion ears through which are threaded securing screws E. The clamp is shown applied to wiring C having a felt packing B, the wiring emerging from a coupling D. However, the wiring and coupling is not a part of this invention, but is entered to illustrate the tool's capacity of compressing and causing registration of the clamp collars that do exist in the electric wiring of an aircraft. Of course, other adaptations of the tool are numerous but not illustrated in the drawings.

To apply the starting tool, it will be seen that one clamp member is loosely positioned at its point of engagement. Then a screw E is inserted through the smooth bore of the companion ear with the head of the screw seating on the outer side of said ear. The spring tensioned pin is seated in the threaded bore of the other companion ear F which is supported by the saddle 10, the latter guiding the shank of the screw into the threaded bore of ear F as it is turned by screw driver 6. The starting tool is removed or substituted by a conventional screw driver. The clamp members are brought to snug engagement and uniformly closed on the packing.

While I have shown and described the application of a screw driver to the threaded shaft, it will be understood that socket wrenches varying in size may be operated by the threaded shaft with equal efficiency, and such modification with respect to the tool may be made as lie within the scope of the appended claim.

My invention what I claim as new and desire to secure by Letters Patent is:

In a clamping and starting tool for screws, or the like, an arm provided with transversely extending end portions, said end portions having aligned bores in parallelism with the arm, one bore being threaded, the other bore being smooth, a threaded shaft engaging in the threaded bore, a driving element removably secured to the threaded shaft and extending toward the smooth bore of the other end portion, a headed pin slidably engaging in the smooth bore and projecting toward the driving element, a spring interposed between the head of the pin and its respective end portion, said head of the pin being conically formed to axially position itself in a threaded bore of one member of a clamping element, a threaded pin threadedly engaging through the arm transversely of and adjacent the conical headed pin, a saddle pivotally mounted on one end of the threaded pin in working relation to the conical headed pin, said saddle supporting the said member of the clamping element and guiding a shank of a screw, positioned in the smooth bore of another member of the clamping element, into the threaded bore of first said member of the clamping element as the driving element is turned by its threaded shaft.

ELIZABETH DAVIS.

REFERENCES CITED

The following references are of record in the file of this patent:

UNITED STATES PATENTS

| Number | Name | Date |
|---|---|---|
| 415,114 | Martin | Nov. 12, 1889 |
| 465,063 | Lehman | Dec. 15, 1891 |
| 536,012 | Bruneau | Mar. 19, 1895 |
| 701,948 | Senn | June 10, 1902 |
| 1,367,969 | Holley | Feb. 8, 1921 |